United States Patent [19]

Beaty

[11] Patent Number: 4,936,269
[45] Date of Patent: Jun. 26, 1990

[54] METHOD AND APPARATUS FOR REDUCED OIL CONSUMPTION AND OIL DETERIORATION IN RECIPROCATING ENGINES

[75] Inventor: Kevin D. Beaty, San Antonio, Tex.

[73] Assignee: Southwest Research Institute, San Antonio, Tex.

[21] Appl. No.: 359,509

[22] Filed: Jun. 1, 1989

[51] Int. Cl.$^5$ ................................................ F02F 5/00
[52] U.S. Cl. .............................. 123/193 CP; 92/212; 92/160; 277/170; 123/74 AE
[58] Field of Search ....... 123/193 CP, 193 C, 74 AE, 123/196 R; 277/170, 171; 92/157, 158, 159, 160, 212

[56] References Cited

U.S. PATENT DOCUMENTS

| | | | |
|---|---|---|---|
| 1,423,680 | 7/1922 | Pfeil | 123/74 AE |
| 1,699,260 | 1/1929 | Winfield | 123/74 AE |
| 2,982,589 | 5/1961 | Richardson, Jr. | 92/82 |
| 3,177,861 | 4/1965 | Quillian, Jr. | 92/82 |
| 3,521,531 | 7/1970 | Kaesemodel | 92/158 |
| 4,598,675 | 7/1986 | Long | 123/90.51 |
| 4,785,720 | 11/1988 | Kojima et al. | 92/159 |

*Primary Examiner*—E. Rollins Cross
*Attorney, Agent, or Firm*—Thomas E. Sisson

[57] ABSTRACT

A method and apparatus for reducing oil consumption and oil deterioration in a reciprocating engine. The engine is provided with ceramic rings and ceramic cylinder linings. Minimal oil lubricant is adsorbed on the surface layer of the rings and liners to form a lubricating boundary-film on the rings and linings. Excess oil lubricant is restricted from entering the piston ring/cylinder lining region to preclude the formation of a hydrodynamic, full film lubricant layer between the rings and linings. Several engine designs are disclosed.

7 Claims, 5 Drawing Sheets

METHOD AND APPARATUS FOR REDUCED OIL CONSUMPTION AND OIL DETERIORATION IN RECIPROCATING ENGINES

This invention arose under United States Government Contract No. DEN 3-352 and the United States Government has a nonexclusive, nontransferable, irrevocable paid-up license to practice or have practiced for or on behalf of the United States this invention throughout the world.

BACKGROUND OF THE INVENTION

The present invention relates to reciprocating engines, and more particularly to reciprocating engines having boundary (marginal) lubrication rather than conventional hydrodynamic (full film) lubrication systems.

Despite the major advances in engine technology over the past ten to fifteen years, oil consumption and oil deterioration still remain as two obstacles which must be overcome before further improvements can be made in today's reciprocating engine. Oil consumption and deterioration are considered the result of the presence of oil in the piston ring/cylinder liner region. Oil must be supplied to this area to provide hydrodynamic lubrication for the sliding rings and piston skirt.

In order to more fully understand the factors involved in piston ring design/lubrication theory, six major categories or cases of piston ring design and lubrication have been identified. These may be described as:

(a) Cast iron rings and liner; hydrodynamic lubrication (Case A);

(b) Ceramic rings and liner; hydrodynamic lubrication (Case B);

(c) Cast iron rings and liner; unlubricated (Case C);

(d) Ceramic rings and liner; unlubricated (Case D);

(e) Cast iron rings and liner; boundary-film lubrication (Case E); and (f) Ceramic rings and liner; boundary-film lubrication (Case F).

The first category (Case A), cast iron rings and liner with hydrodynamic lubrication, is currently used in virtually all reciprocating engine design. This design depends on the lubricant to provide a minimum oil film thickness between the ring and liner to prevent metal-to-metal contact. The oil also serves to transfer heat from the piston rings to the cylinder wall. The primary factors which affect piston ring-cylinder wall friction with this design are the temperature and characteristics of the lubricant.

Ceramic rings and cylinder liners may also be operated with hydrodynamic lubrication (Case B). This is not common, or even practical, due to the high cost of ceramic components and the negligible difference in friction levels compared with conventional cast iron components. The insignificant difference in friction is due to the fact that there is limited interaction between the ring surface and the cylinder wall surface as a result of the presence of the oil film. Thus, the lubricant's properties determine the major friction levels with hydrodynamic lubrication regardless of the material used for the rings or liner.

Unlubricated cast iron rings and liners (Case C) will not work for the same reasons that boundary-film lubricated cast iron components will not work as will be discussed below. Unlubricated ceramic components (Case D) can be used successfully with ion-implantation to reduce the friction and wear. Such a method is disclosed in U.S. Pat. No. 4,775,548. However, this type of ceramic operation (Case D) is not involved for the purposes of this invention.

Ceramic rings and cylinder liners are considered necessary for boundary-film lubrication (Case F) because conventional cast iron rings and liners can not survive under these conditions (Case E). There are two theories which explain the successful operation of ceramics under boundary-film lubrication compared to the failure of cast iron components under identical conditions.

Under boundary-film lubrication, there is no hydrodynamic oil-film present for lubrication. Instead, only a small amount of oil is adsorbed into the surface of the two materials. Thus, the sliding surfaces are allowed to contact each other during the entire piston stroke cycle of the engine. During sliding motion, the surface asperities of the two materials come into contact with each other and tend to shear at their base. If the melting point of either material is low enough, the asperities will melt as they shear at their base causing the friction force to increase significantly. This is the case with cast iron components, and this phenomenon is commonly referred to as scuffing. Typically, scuffing leads to a runaway condition where more and more asperities come into contact with each other after the highest peaks have sheared. This leads to an increasing contact area whose asperities are being welded together and results in engine seizure.

However, the melting point of the ceramics is much higher than that of the case iron. As a result, the asperity peaks of the ceramics are not prone to melt and shear as they come into contact with each other. Thus, the friction force remains low and engine failure is not a problem.

The invention described herein provides benefits from reduced oil consumption and oil deterioration which include reduced particulate emissions, reduced operating costs, and increased oil change intervals.

SUMMARY OF THE INVENTION

The present invention describes a method and apparatus for reducing oil consumption and oil deterioration in all reciprocating engines. This can be accomplished by combining boundary lubricated ceramic piston rings and cylinder liners with unique engine configurations.

DETAILED DESCRIPTION OF THE PREFERRED EMBODIMENT

Figure 1A:
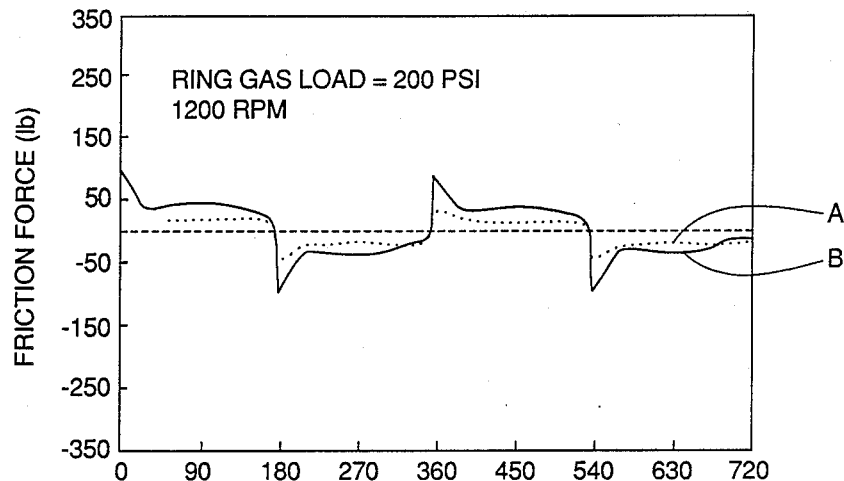
FIGS. 1A and 1B illustrate test results showing a comparison of ring friction characteristics.
Figure 1B:
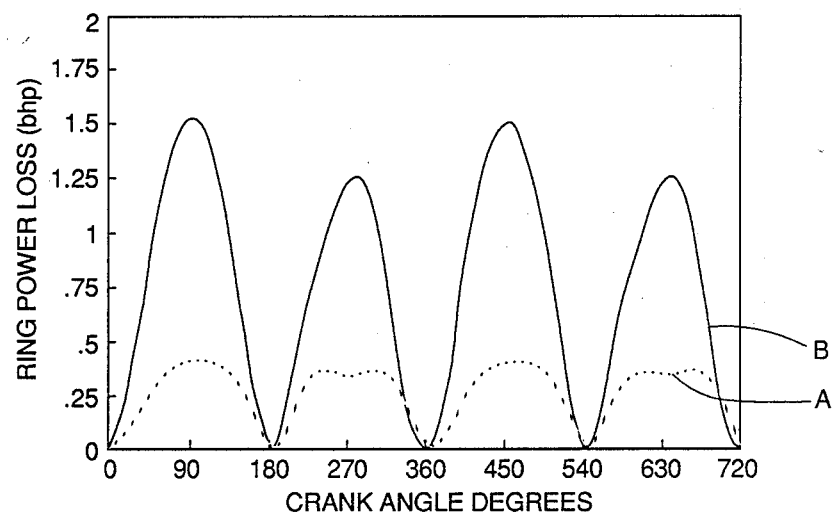

Monolithic or coated ceramic rings and liner are required to make the present invention possible. Recent test results show that ceramic rings, when run with a ceramic liner in a test rig, yield lower friction values under boundary (marginal) lubrication than conventional cast-iron rings and liner under hydrodynamic (full film) lubrication. This is shown in FIGS. 1A and 1B, where dotted line A represents the data obtained for the ceramic rings and liner under boundary lubrication of the present invention and the solid line B represents cast iron rings and liners under full film lubrication.

One explanation for this unusual result is the equation for the friction coefficient in boundary lubrication:

$$\mu_f = \frac{\sigma_o}{\sigma_m}$$

where
$\mu_f$=coefficient of friction for boundary lubrication
$\sigma_o$=shear strength of the adsorbed oil layer
$\sigma_m$=yield strength of the material Thus, in boundary lubrication, for any given shear strength oil, the very high hardness and yield strength of the ceramic materials should result in a lower coefficient of friction. This is significant because it implies that only enough oil must be supplied to the ring/liner region for adsorption of the oil on the ceramic surface to take place. This factor reduces the need for oil in the region of the engine where the majority of oil consumption and oil deterioration is considered to take place.

The simple installation of ceramic rings and cylinder liners in a reciprocating engine will not result in reduced oil consumption or deterioration. Engine modifications must be made to reduce the amount of oil supplied to the rings and liner. There are several design approaches which may be used.

Figure 2:
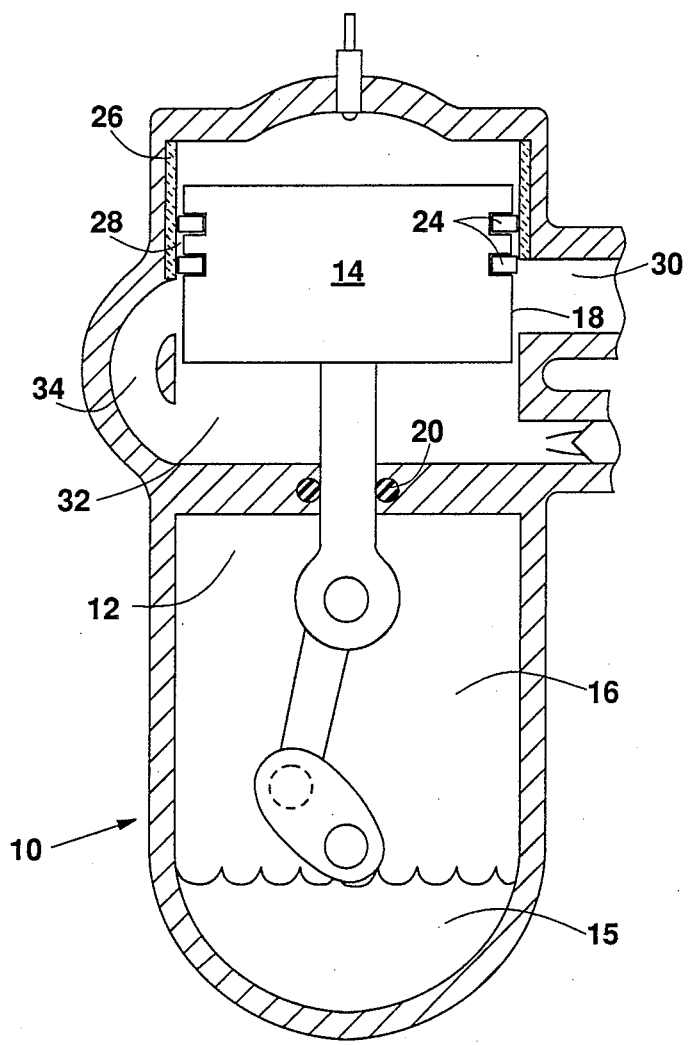
FIG. 2 illustrates a crosshead-type engine configuration of the present invention.

A crosshead-type configuration is shown for a two-stroke reciprocating engine 10 in FIG. 2. This configuration uses the crosshead guide 12 to take the thrust loads normally exerted on the piston 14, and to seal the crankcase 16, which also serves a reservoir for oil 15. By removing the side thrust loads on the piston skirt 18, oil is no longer needed for skirt lubrication. Proper sealing of the crankcase 16 reduces the amount of oil leakage into the ring/liner area, thus reducing oil consumption and deterioration.

Seal 20 only allows a minimum (0.01 percent of mass fuel flow) of oil 15 to be carried by piston rod 22 into the piston chamber for exposure to ceramic piston rings 24 and ceramic cylinder lining 26. Oil 10 is adsorbed into the surface of rings 24 and lining 26 forming a boundary-film on the ring and liner surface. Seal 20 restricts any excess oil from entering the piston ring/cylinder liner region 28 precluding the formation of the conventional hydrodynamic (full film) lubrication layer between the rings 24 and lining 26. It is excess oil in the ring/liner region 28 which is discharged through exhaust port 30 that produces noxious particulate emissions. Thus by having a minimal amount of oil adsorbed on the surface of the ceramic rings and lining, less oil is consumed and fewer particulate emissions result.

An alternative method for forming the boundary-film on the ring and liner surfaces in a crosshead type engine and in diesel engines is to incorporate a simple system to deliver a measured amount of lubricant into the piston chamber 32 or transfer port 34 through the air inlet port 36. By sealing oil transfer from the crankcase 16 and only allowing a minimal amount (0.01 percent of mass fuel flow) of oil to enter the ring/liner region through the injection of oil in the inlet air, insufficient amounts of oil in the ring/liner region preclude the formation of the conventional high oil consumption full film hydrodynamic layer between the rings and liner.

Figure 3:
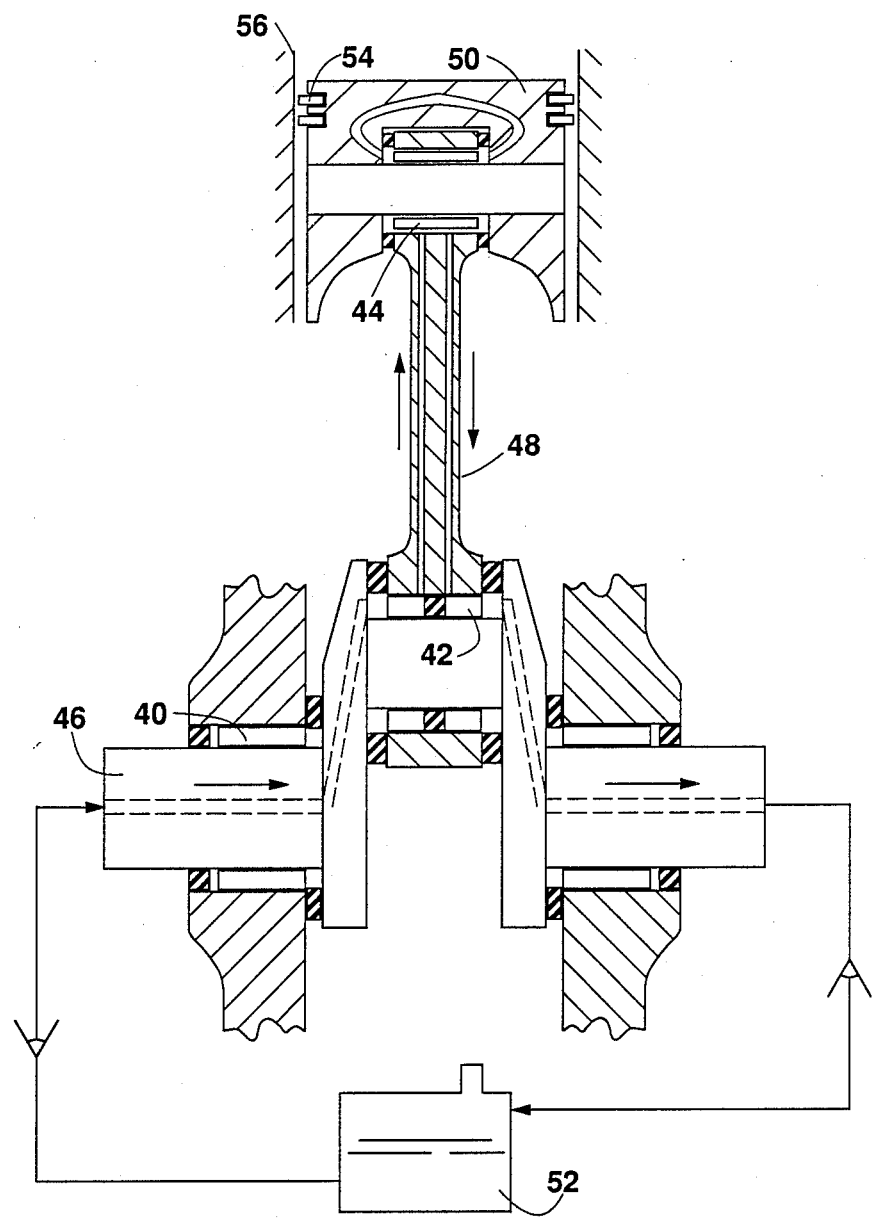
FIG. 3 illustrates a closed-loop oil system configuration of the present invention.

A closed-loop oil system is shown in FIG. 3. This configuration may be used to provide lubrication to the crank pin 40, rod pin 42, and wrist pin 44 bearings by circulating oil through the crankshaft 46, connecting rod 48 and piston 50 from a sealed oil reservoir or tank 52. The arrows in FIG. 3 represent the direction of oil flow. Only a very small amount of oil leakage occurs at the bearing seals, and this provides oil for adsorption on the rings 54 and liner 56 to form the boundary film on the rings 54 and 56.

Seals commonly known in the art may be utilized so long as they assure a leakage rate equivalent to approximately 0.01 percent of fuel flow.

Thus, oil deterioration is reduced because only the small amounts of oil passing through the crankshaft 46, connecting rod 48, and piston 50 are exposed to the high temperature conditions in an operating engine. Excess or reserved oil is maintained in a separate, and even isolated, oil tank 52.

Figure 4:
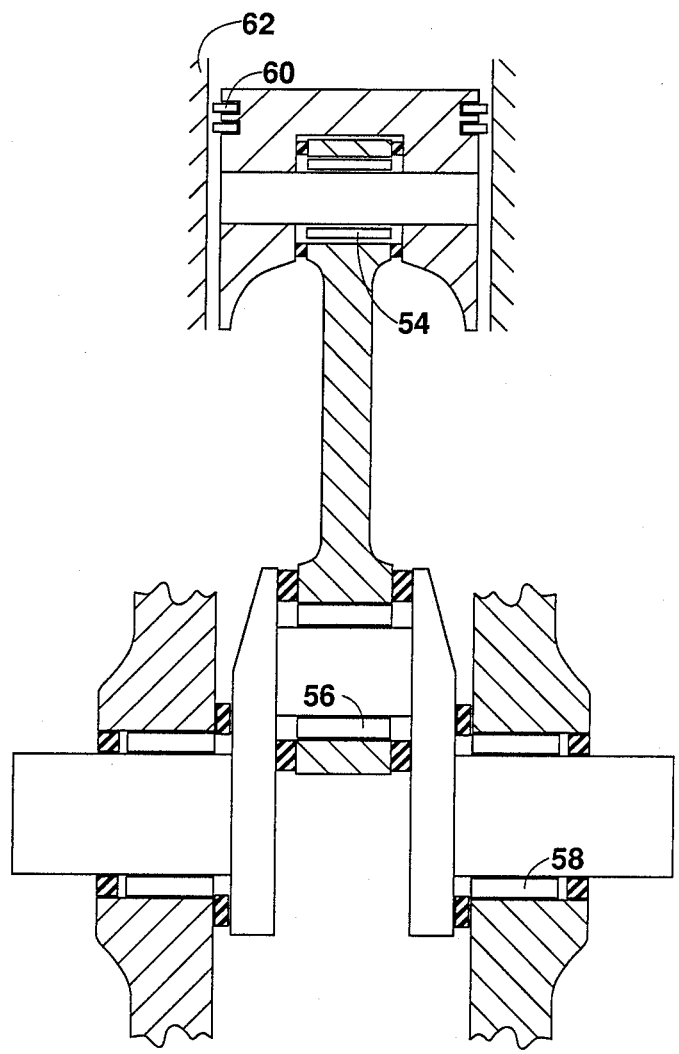
FIG. 4 illustrates a permanently sealed and lubricated bearing system of the present invention.

A "dry" engine configuration is illustrated in FIG. 4 which features permanently sealed and lubricated (or unlubricated) wrist 54, rod 56 and crank 58 bearings. This configuration could require a very small amount of oil injection through the intake valve (not shown) for adsorption on the ceramic rings 60 and liner 62. In a diesel engine, the fuel alone may provide sufficient lubrication for the rings 60 and liner 62, due to the higher concentration of sulfur and other lubricating components in diesel fuel, compared with gasoline.

Figure 5:
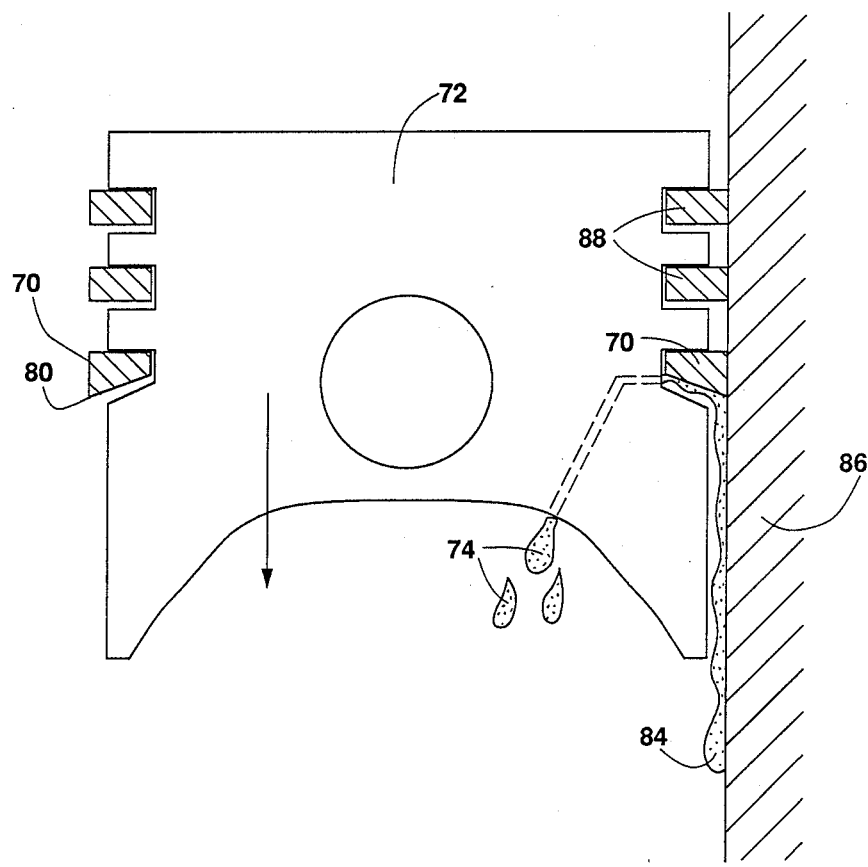
FIG. 5 illustrates a specialized oil control ring and piston design of the present invention.

A specialized oil control ring 70 and piston 72 are shown in FIG. 5 which may be used to divert excess oil flow 74 back into the crankcase (not shown) through rod conduit 76. Only a small portion of oil is allowed to migrate up into the ceramic ring/liner region 78. This configuration may be used to retrofit engines which are currently in the field with the present invention.

Oil control ring 70 has a sharp leading edge 80 and a tapered face 82 which, upon the downward stroke of piston 72, wipe excess oil 84 from the cylinder liner 86 and directs it through conduit 76 and away from the ring/liner region 78. By increasing the normal ring tension of ceramic control ring 70, ring 70 and the other ceramic rings 88 contact liner 86 under boundary-film conditions, rather than hydrodynamic full film conditions.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. A method for reducing oil consumption and oil deterioration in a reciprocating engine comprising the steps of:
   (a) providing said engine with ceramic rings and ceramic cylinder linings said rings and said linings being in direct sliding contact;
   (b) providing a means for the minimal adsorption of an oil lubricant on said rings and said linings to form a lubricating boundary-film on said rings and linings; and
   (c) providing a means for restriction of an excess of said oil lubricant from entering the piston ring/cylinder liner region of said engine precluding a hydrodynamic, full film lubricant layer between said rings and linings.

2. The method of claim 1 wherein said minimal adsorption of said oil lubricant is an amount of approximately 0.01 percent of the mass fuel flow through said engine.

3. The method of claim 1 wherein said means for said minimal adsorption of said oil lubricant comprises a seal at a crosshead guide in said engine allowing a minimal amount of said lubricant to be carried to said piston ring/cylinder liner region by a piston rod extending between said region and a sealed crankcase housing a reservoir of said lubricant.

4. The method of claim 1 wherein said means for said minimal adsorption of said oil lubricant comprises a means for delivery of a measured amount of said lubricant through the air inlet of said engine to form said boundary-film.

5. The method of claim 1 wherein said means for said minimal adsorption of said oil lubricant comprises a generally closed-looped flow path for said lubricant to pass through crank pin, rod pin, and wrist pin bearings in said engine, said bearings allowing minimal amount of leakage of said lubricant to be carried to said piston ring/cylinder liner region to form said boundary-film.

6. The method of claim 1 wherein said minimal adsorption means and said restriction means comprises a sharp leading edge on at least one of said ceramic rings, said ring further having a tapered face for directing said excess of said lubricant through its corresponding piston head and away from said piston ring/cylinder liner region, said ring further adjusted to a higher ring tension.

7. A reciprocating engine comprising:
ceramic rings and ceramic cylinder linings said rings and linings in direct sliding contact;
means for minimal adsorption of an oil lubricant on said rings and said linings to form a lubricating boundary-film on said rings and linings and for restriction of an excess of said oil lubricant from entering the piston ring/cylinder liner region of said engine precluding a hydrodynamic, full-film lubricant layer between said rings and linings.

* * * * *